United States Patent [19]

Hutchins

[11] 3,965,801

[45] June 29, 1976

[54] STRAIGHT LINE ABRADING TOOL

[76] Inventor: Alma A. Hutchins, 49 N. Lotus Ave., Pasadena, Calif. 91107

[22] Filed: Jan. 27, 1975

[21] Appl. No.: 544,267

Related U.S. Application Data

[62] Division of Ser. No. 498,534, Aug. 19, 1974, Pat. No. 3,932,963.

[52] U.S. Cl. ............................ 91/351; 91/352; 137/625.21; 251/77; 251/58
[51] Int. Cl.² ................ F01L 31/18; F16K 31/16
[58] Field of Search ............... 137/625.21; 91/351, 91/352; 251/77

[56] References Cited
UNITED STATES PATENTS

| 383,287 | 5/1888 | Fiske | 137/625.21 |
| 1,009,664 | 11/1911 | Hefty et al. | 137/625.21 |
| 2,731,954 | 1/1956 | O'Shei | 137/625.21 |
| 3,274,895 | 9/1966 | Hendrickson | 137/625.21 |
| 3,297,052 | 1/1967 | Robinson | 137/625.21 |

*Primary Examiner*—Paul E. Maslousky
*Attorney, Agent, or Firm*—William P. Green

[57] ABSTRACT

A portable abrading tool having a cylinder body containing a double ended piston with a reduced dimension intermediate portion of the piston carrying two oppositely facing racks engageable with two gear units which in turn engage two additional oppositely facing racks on a shoe to cause reciprocation thereof. A valving mechanism may include a rotatably oscillatable gear sector containing a pocket recess loosely receiving a valve element in a lost motion relation. An aspirator may be provided for withdrawing air and abraded particles from the vicinity of a work surface.

14 Claims, 20 Drawing Figures

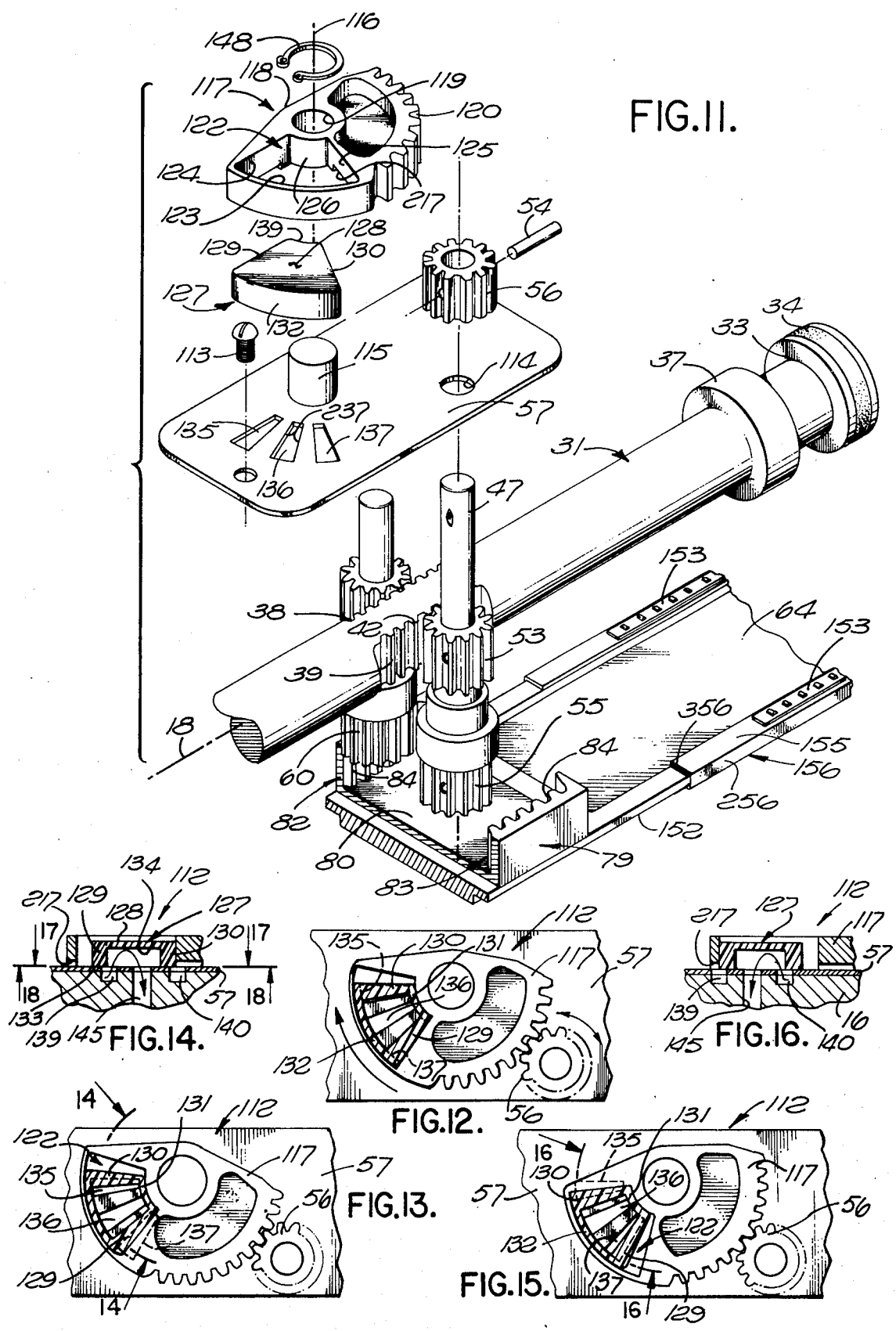

STRAIGHT LINE ABRADING TOOL

This is a division of application Ser. No. 498,534, filed Aug. 19, 1974, now U.S. Pat. No. 3,932,963.

BACKGROUND OF THE INVENTION

This invention relates to improved portable abrading tools, such as power driven sanders or the like.

The tools of the present invention are of a known general type in which a piston is reciprocated within a cylinder body by pressure fluid, usually compressed air, and acts to reciprocate a work abrading shoe relative to the body. In certain prior devices of this type, the piston has been provided with a toothed rack which engages and meshes with a gear unit rotatably mounted to the body of the device, with that gear also engaging a second rack connected to the abrading shoe to drive the shoe.

The prior devices of this type with which I am familiar have tended inherently to vibrate the body of the tool excessively in operation, with resultant discomfort to the user and difficulty of precise control of the positioning of the tool on the work. In addition, the rack and gear drives heretofore employed have been of a character tending to exert lateral or transverse force against the piston and/or the shoe, in a manner causing excessive wear of these parts and their bearing surfaces with respect to the body of the device, and particularly tending to cause excessive wear of the engaging piston and cylinder surfaces. Additionally, the valving for controlling flow of air or other pressurized fluid to opposite ends of the cylinder has been so ineffective and impositive in nature that the entire reciprocating motion frequently stops upon imposition of a fairly light manual force against the tool.

SUMMARY OF THE INVENTION

In a tool embodying the present invention, an improved gear and rack drive arrangement is provided which balances the forces exerted laterally against the reciprocating piston in a manner allowing the piston to move axially with minimum resistance, and avoiding the imposition of any substantial lateral force by the piston against the cylinder wall. In this way, the wear on the piston and cylinder is minimized, and vibrational forces encountered in prior arrangements are minimized or eliminated. To achieve this result, the piston structure is provided with two different toothed racks, both facing transversely with respect to the axis of reciprocating movement of the piston, but so oriented as to face in two different and opposite transverse directions respectively. Desirably, these two racks are formed at opposite sides of a reduced dimension central portion of the piston structure, and face in directions away from one another. In engagement with these two racks, there are provided two separate gear units, having teeth meshing with the teeth of the racks and both mounted for rotation relative to the cylinder body. As a result of this relationship, the forces which are exerted laterally or transversely against the two gear units by the racks when the piston is moved axially are in opposition to one another, and are transmitted to the body of the tool in balanced relation avoiding the exertion of any transverse or lateral force against the body relative to the piston, or vice versa.

To similarly balance the transmission of lateral forces between the body of the tool and the reciprocating abrading shoe, the shoe desirably also has two racks facing in opposite directions and engageable with two gear units, so that the force exerted transversely against the shoe by one gear unit is balanced by a similar and equal force exerted against the shoe in the opposite direction by the other gear unit. Further, in addition to the discussed balancing of lateral forces, the pairs of racks and gear units serve inherently to balance the rotary forces exerted against the gear units and the longitudinal or axial forces exerted against the racks, all in a manner resulting in an extremely smoothly operating, vibrationless, and low friction tool.

Certain additional features of the invention relate to a preferred valve mechanism which has been provided for alternately admitting pressure fluid to opposite ends of the cylinder. This valve mechanism desirably includes an actuating part which has oscillating motion as the piston reciprocates, and which has a lost motion connection with a coacting valve element slidably engaging a surface containing fluid passing apertures controlled by the valve element. The actuating part may be a gear sector driven by one of the previously mentioned gear units or the like, and containing a confining recess or opening within which the valve element is loosely received in confined relation. The inlet pressure fluid can be admitted to the valve assembly in a manner causing that pressure to continuously urge the valve element tightly against the apertured valving surface with which it is slidably engaged.

Another feature of the invention resides in an improved dust free arrangement for withdrawing abraded particles from the vicinity of the work surface, by suction means preferably including an aspirator energized by a primary flow of pressure fluid to produce a secondary flow of fluid through the abrading shoe to the aspirator, in accordance with the general teachings of my prior U.S. Pat. No. 3,785,092. In accordance with the present invention, the suction system desirably includes two conduits connected to the body of the tool and the reciprocating shoe respectively, and extending parallel to the axis of reciprocation of the shoe, and having portions which interfit telescopically in a manner allowing relative reciprocating movement of the two conduits while conducting the abraded particles therethrough.

BRIEF DESCRIPTION OF THE DRAWINGS

The above and other features and objects of the invention will be better understood from the following detailed description of the typical embodiment illustrated in the accompanying drawings in which:

FIG. 11 is a fragmentary exploded perspective view showing the interrelationship of the various gears and racks;

FIG. 12 is a fragmentary top plan view of the valve mechanism, taken on line 12—12 of FIG. 2;

FIG. 13 shows the valve in a first extreme position;

FIG. 14 is a vertical section on line 14—14 of FIG. 13;

FIG. 15 shows the valve in a second extreme position;

FIG. 16 is a fragmentary vertical section taken on line 16—16 of FIG. 15;

DESCRIPTION OF THE PREFERRED EMBODIMENTS

Figures 1, 2, 3:
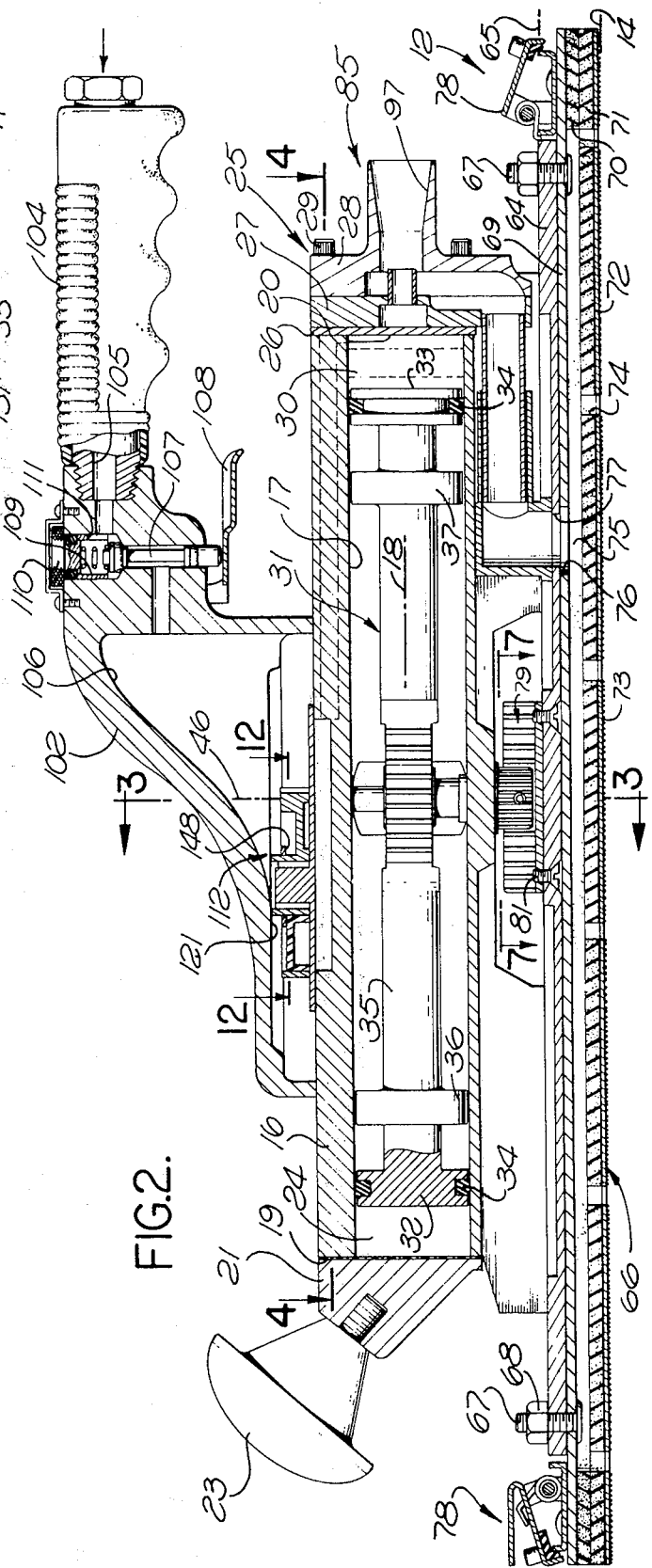
FIG. 1 is a perspective view of a straight line sander embodying the invention.
FIG. 2 is an enlarged longitudinal vertical section through the FIG. 1 tool.
FIG. 3 is a transverse vertical section taken on line 3—3 of FIG. 2.

A portable powered sander embodying the invention is represented generally at 10 in FIG. 1, and includes a main body section 11 containing a piston and cylinder mechanism which acts to reciprocate a sanding shoe 12 relative to the body. The device is powered by a pressurized fluid, preferably compressed air, from a source of such fluid represented diagrammatically at 13. Dust abraded from the work surface 14 is removed by suction from the vicinity of the work surface and accumulated within a collection bag 15.

Figure 4:
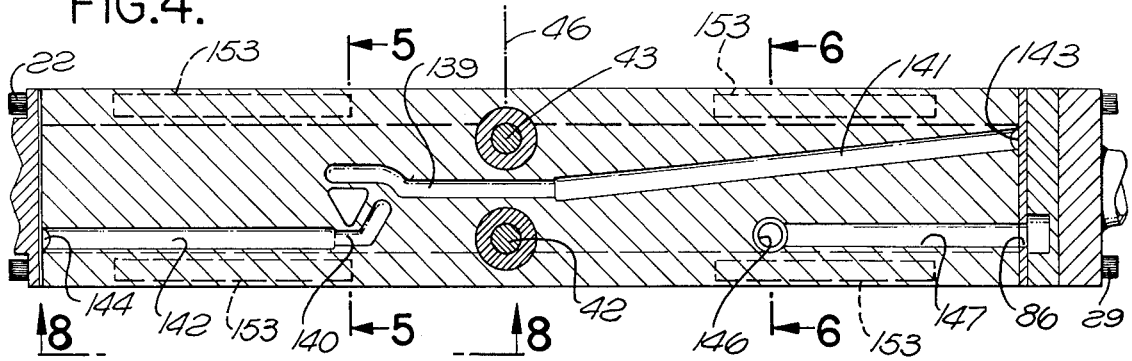
FIG. 4 is a fragmentary horizontal section taken on line 4—4 of FIG. 2.
Figure 5:
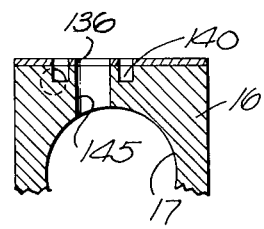
FIGS. 5 and 6 are fragmentaary vertical sections taken on lines 5—5 and 6—6 respectively of FIG. 4.
Figure 6:
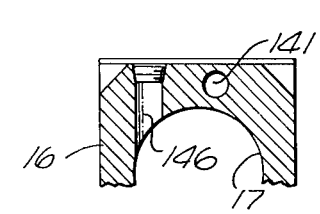
Figure 7:
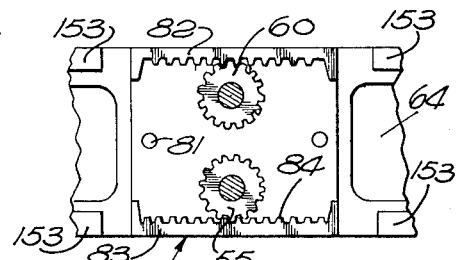
FIG. 7 is a fragmentary horizontal section taken on line 7—7 of FIG. 2.

The body section 11 includes a rigid somewhat elongated main body part 16, which in vertical transverse section has the essentially rectangular cross section illustrated in FIG. 5. Internally, this part 16 contains and forms a cylinder bore 17 (FIGS. 2, 5 and 6), centered about and extending along an axis 18 which in the FIGS. 1 and 2 position of the tool extends horizontally and parallel to the upper horizontal surface of the illustrated work piece 14 which is to be sanded. The bore 17 is of straight cylindrical configuration about axis 18 through the entire length of main body part 16, from the location of a vertical planar transverse forward end face 19 of part 16 to the location of a vertical planar transverse rear face 20. The forward end of bore 17 may be closed by a front end wall part 21, suitably secured to part 16 by screws or other fasteners 22 (FIGS. 1 and 4), and carrying a forwardly inclined front handle 23 by which the body structure 11 is manipulated. Part 21 is sealed annularly with respect to part 16, to close the end of a cylinder chamber 24 at the forward end of the device.

At its rear end, the cylinder bore 17 is closed by an appropriate wall structure 25 (FIGS. 2 and 10), which may be formed sectionally of three different transverse walls members 26, 27 and 28, all secured tightly to the rear end of part 16 by a number of screws or other fasteners 29. Gaskets or other sealing means may be provided between these various parts to prevent leakage therebetween except through the designed air flow passages which will be discussed at a later point in this description. Thus, the composite wall structure 25 defines the back of a second cylinder chamber 30 within the body structure.

Mounted within cylinder bore 17, there is provided a piston element 31, which is power reciprocated in opposite directions along axis 18 and within the cylinder bore. This piston 31 has two enlarged circular piston heads 32 and 33 at its opposite ends exposed to the air pressure within the two previously discussed end cylinder chambers 24 and 30 respectively, with annular rings 34 carried about the piston heads for forming airtight seals with the cylinder wall 17. The two piston heads 32 and 33 are interconnected by a reduced diameter portion 35 of the piston 31. Spaced axially inwardly from the two piston heads 32 and 33, the piston structure 31 may carry two additional externally circular enlargements 36 and 37 for slidably engaging the cylinder walls 17 in a manner assisting in locating the piston within the cylinder bore.

At the center of its length along axis 18, the reduced diameter portion 35 of piston 31 is shaped to form or carry two gear racks 38 and 39 (FIGS. 2, 3 and 11), which face in two diametrically opposite directions transversely of axis 18. These two opposite transverse directions are represented by the two arrows 40 and 41 respectively in FIG. 3. Each of the racks 38 and 39 is formed as a series of teeth 42 extending vertically at a side of the piston 31 and spaced apart in a front to rear direction parallel to axis 18.

At opposite sides of the rack portion of piston 31, body part 16 rotatably carries two gear units 42 and 43, which turn about two parallel vertical axes 44 and 45 lying in a common vertical plane 46 (FIGS. 2 and 4) disposed transversely of the main axis 18 of the tool. The first of these gear units 42 includes a vertical shaft 47 journaled by upper and lower bearings 48 and 49 for rotation about axis 44. The upper bearing 48 may typically be a sleeve bushing, as shown, while the lower bearing 49 is preferably a roller type bearing assembly having an outer annular housing 50 pressed into the lower end of a vertical cylindrical recess 51 formed in body 16, and carrying roller elements engaging the outer cylindrical surface of a bushing sleeve 32 carried about shaft 47. Sleeve 52 is preferably rotatable relative to the shaft to enhance the rotary mounting of the shaft.

At a location vertically between the two bearings 48 and 49, shaft 47 rigidly carries a gear wheel or pinion 53, which may be secured to shaft 47 in any appropriate manner as by a transverse pin represented at 54, and which gear has vertical teeth meshing with the teeth of rack 42 on the piston structure. At its lower end, shaft 47 rigidly carries a second gear 55. At the upper end, shaft 47 carries a third gear 56, which is located above a horizontal valve aperture plate 57 secured to the upper surface of body part 16.

The second gear unit 43 is similar to unit 42, except for the deletion of the upper gear 56. More particularly, unit 43 includes a shaft 58 rigidly carrying a gear wheel 59 meshing with rack teeth 38 of the piston, and also rigidly carrying a lower gear wheel 60 laterally opposite gear 55 of unit 42. Shaft 58 may be mounted for rotation about its individual axis 45 by an upper bushing sleeve 61 corresponding to sleeve 48 of unit 42, and a lower roller bearing assembly 62 and engaging sleeve 63 corresponding to bearing 49 and sleeve 52 associated with shaft 47.

The sanding shoe assembly 12 includes a horizontally extending and elongated main shoe 64 which reciprocates along an axis 65 (FIG. 2) extending parallel to main axis 18 of the piston and cylinder mechanism. Attached to this part 64, the shoe assembly 11 includes a sandpaper carrying unit 66, which may be secured to plate 64 by a pair of screws 67 projecting upwardly through plate 64 and retained by nuts 68. Assembly 66 may be formed of several interconnected flat vertically successive horizontal plates or laminations, including an upper rigid plate 69 of aluminum or the like, and two cushion layers 70 and 71. The lower cushion part 71 has a horizontal under surface 72 against which a sheet of sandpaper 73 is held, with apertures 74 being formed in both the sandpaper and part 71 at spaced locations for passing air and dust particles upwardly into the interior of the shoe. The next upper layer 70 contains a passage or series of interconnecting passages 75 through which the air and dust travels to the location of a single circular opening 76 formed in plate 69, and a registering circular aperture 77 formed in part 64. The two cushion layers 70 and 71 may be formed of an appropriate elastomeric material, such as rubber or a suitable resinous plastic material, and be cemented or otherwise bonded together and to plate 69 in a manner forming the parts 69, 79 and 71 into a single unitary structure in which the bonded areas form seals about apertures 74 and passage 75 to effectively confine the dust for delivery only to the apertures 76 and 77. At its opposite ends, the plate 69 may carry two spring clips 78, adapted to grip and retain the opposite ends of the sandpaper sheet 73 in a manner holding the sheet tightly against the under surface of the shoe.

At the location of the two gear units 42 and 43, upper plate 64 of the shoe carries a channel shaped rack element 79 (FIGS. 2, 3, 7 and 11), having a horizontal mounting portion 80 secured rigidly by screws 81 to a central portion of plate 64, and having two essentially parallel upwardly projecting opposite side flange portions 82 and 83 meshing with lower gears 55 and 60 respectively of units 42 and 43. These racks have vertical teeth 84 which are spaced apart in the direction of axis 18, to cause reciprocating movement of shoe 11 in response to rotation of units 42 and 43 by piston 31. The lower gears 55 and 66 may be of the same diameter as upper gears 53 and 59, and have the same number of teeth, to cause reciprocation of shoe 11 through the same range of travel as piston 31, but reversely.

Figure 10:
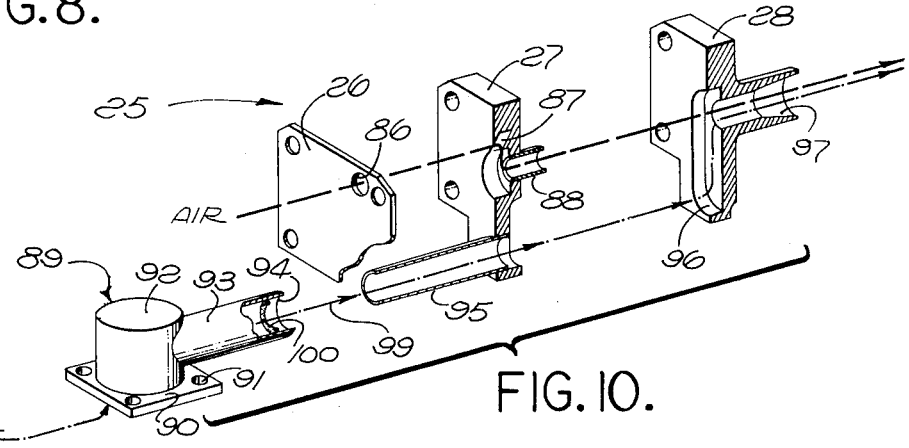
FIG. 10 is an exploded perspective view of the aspirator.
Figure 17:
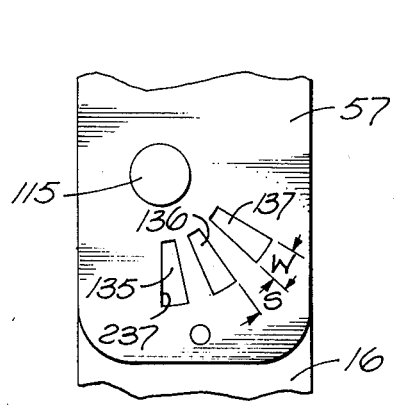
FIGS. 17 and 18 are horizontal sections taken on lines 17—17 and 18—18 of FIG. 14.

As best illustrated in FIGS. 2 and 10, the discussed withdrawl of dust particles upwardly through the shoe 11 is induced by an aspirator assembly 85, to which the exhaust air from cylinder chambers 24 and 30 is delivered as a primary air-flow stream, still at a pressure well above atmospheric pressure, after having driven the piston. This primary flow of discharge air from the cylinder passes through an opening 86 in plate 26 (FIG. 10), and then flows downwardly through a communicating passage 87 in plate 27, for delivery rearwardly through a tubular nozzle element 88 carried by part 27. This primary flow of air emitting from nozzle 88 induces a secondary flow of air upwardly from the shoe through a part 89 carried by main show plate 64. Part 89 has a lower horizontal mounting portion 90 secured by screws at 91 to the upper surface of plate 64, and carrying a typically cylindrical upwardly projecting portion 92 of part 89 from which a straight cylindrical portion 93 of part 89 projects rearwardly. Thus portions 92 and 93 form in effect an elbow attached to and movabe with the shoe and through which air and entrained dust particles flow upwardly from the shoe and then rearwardly to the location 94.

Communicating with tube 93 of part 89 is a second horizontal tube 95 slidably and telescopically received within tube 93, and rigidly carried by and projecting rearwardly from the previously discussed part 27 secured to the body of the tool. The forward end of tube 95 communicates with a passage 96 in part 28, through which the air and entrained particles flow upwardly to the location of nozzle 88, to deliver the secondary flow of air from the shoe to the nozzle location in a manner causing high velocity air emitting from the nozzle to induce movement of air and particles along the secondary flow path by aspirator action. Thus, the combined streams flow rearwardly through a discharge tube or projection 97 on part 28, which is connected to hose 98 leading to the dust collection bag 15. The two telescopically interfitting tubes 93 and 95 extend along and are centered about an axis 99 which is parallel to the piston and shoe axes 18 and 65, and extends horizontally in the illustrated position of the tool, so that the two tubes 93 and 95 effectively conduct the secondary flow of air along its defined path from the shoe to the body of the device without interfering with the relative reciprocating movement of the shoe and body. A suitable seal ring 100 may be provided between the tubes 93 and 95 for forming a seal therebetween, to prevent escape of any of the air or dust at this location.

The inlet air to the tool may be delivered from the compressed air supply represented at 13 in FIG. 1 through a flexible hose 101, connecting into a hollow inlet housing or fitting 102 which is rigidly secured to the upper side of body part 16 by screws 103. A handle 104 may be secured to part 102, and contain an air inlet passage 105 communicating with a chamber 106 formed in the interior of part 102. A valve element 107 may be actuated by a trigger element 108 to control the flow of air to chamber 106, with a rotary sleeve valve 109 being provided adjusting the maximum rate of air delivery when tthe trigger is actuated. A manually rotatable control element 110 connected to the upper end of sleeve 109 turns it between different positions in which an opening or notch 111 in the sleeve will pass more or less air to chamber 106.

For alternately admitting air to opposite ends of the piston, in order to cause its reciprocation, there is provided at the upper side of the housing and within the hollow element 102 a valve assembly 112 (FIG. 2 and FIGS. 11 through 16). This valve assembly includes the previously mentioned horizontal plate 57, which is secured to and extends across a central portion of the upper side of body 16. Plate 57 is secured to the body in fixed position by appropriate fasteners, such as screws 113 of FIG. 11, and has an opening 114 through which shaft 47 projects upwardly for attachment to top gear 56. At a location offset from gear 56, plate 57 rigidly carries an upwardly projecting boss or mounting post 115 having an external cylindrical surface centered about a vertical axis 116 parallel to axes 44 and 45 of the gears. A gear sector element 117 is mounted about post 115, and has a hub portion 118 with an internal cylindrical surface 119 received closely about and located by the outer surface of post 115, in a manner mounting sector 117 for rotary oscillatory movement about axis 116 between the positions of FIGS. 13 and 15. A series of vertical gear teeth 120 on sector element 117 extend arcuately about axis 116, and mesh with the teeth of gear 56 in a manner causing rotary oscillation of sector 117 in response to rotary oscillation of gear 56, but through a reduced angle. This reduced angle of oscillation of the gear sector results from the fact that the teeth 120 of gear sector 117 are spaced a radial distance from their axis 116 which is greater than the radial distance of the teeth of gear 56 from their axis. Sector 117 is retained axially, against upward movement off of post 115, in any convenient manner, preferably by providing element 102 with an under surface 121 (FIG. 2) which is received in close proximity to the hub portion 118 of the sector and prevents its movement off of projection 115 even though the tool is inverted in use.

Sector 117 contains an opening 122 extending vertically therethrough and itself having the shape essentially of a sector of a circle. More particularly, this opening is defined by two arcuately extending partial cylindrical wall surfaces 123 and 126 centered about axis 116, and two radially extending planar wall surfaces 124 and 125 lying in planes containing axis 116. A sector shaped valve element 127 is located within opening 122, and is free for some limited movement relative to sector part 117 about axis 116 and between the positions of FIGS. 13 and 15 respectively. Valve element 127 has a top horizontal wall 128, disposed parallel to and spaced above plate 57, and carrying downwardly projecting peripheral walls including two walls 129 and 130 extending radially with respect to axis 116 and two radially inner and outer vertical walls 131 and 132 extending arcuately about axis 116 and having partial cylindrical radially inner and outer surfaces. At the lower ends of the various walls 129, 130, 131 and 132, there is formed a planar under surface 133 of element 127 slidably engaging the top surface of plate 57, and extending continuously about and enclosing a recess 134 formed in the under surface of the valve element 127. The various vertical walls 129, 130, 131 and 132 of valve element 127 may be of uniform cross section throughout their entire height, with that cross section being illustrated by the hatched lines in FIGS. 12, 13 and 15.

Valve element 127 acts by its oscillatory movement about axis 116 to control air flow through three preferably identical circularly spaced apertures 135, 136 and 137 in plate 57. Each of these apertures is defined at its opposite sides by two diverging side edges 237 which extend radially with respect to axis 116, with the circular widths $w$ of the individual apertures desirably being equal to the circular spacing $s$ between successive apertures. Two of the apertures 135 and 137 communicate with the two chambers 30 and 24 respectively at the opposite ends of piston 31, through grooves 139 and 140 formed in the upper surface of body 16 beneath plate 57 (FIG. 4), and communicating passages 141 and 142 extending through the interior of body 16 to locations 143 and 144 at which the passages communicate with the opposite end cylinder chambers.

The circularly intermediate third aperture 136 in plate 57 communicates with nozzle 88 of the aspirator mechanism, and acts as the discharge from the valve mechanism. More particularly, as seen in FIG. 5, air discharging downwardly through aperture 136 may flow through a communicating passage 145 in body 16 into a central portion of cylinder bore 17. This passage 145 is always located axially between two piston heads 32 and 33, in all positions of the piston. The discharge air from this central portion of the cylinder flows upwardly into another passage 146 in body 16, which passage also always communicates with the location between the two piston heads, and the air then flows from passage 146 into a horizontal passage 147 leading to the previously discussed aperture 86 in end plate 26, for delivery therefrom to the aspirator nozzle as has been discussed.

Figure 18:
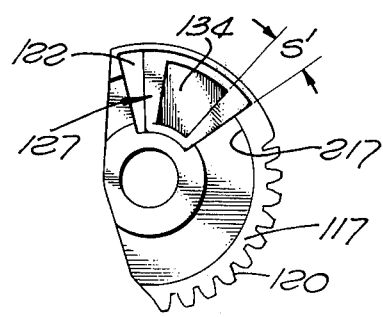

As will be best understood by reference to FIG. 12, which shows the valve element in an approximately central position relative to apertures 135, 136 and 137, the width $w$ of each of the apertures in a direction circularly about axis 116 preferably corresponds substantially exactly to the thickness $s'$ of each of the two valving side walls 129 and 130 of valve element 127. These side walls 129 and 130 progressively increase in thickness as they advance radially outwardly in correspondence with the discussed increase in width of apertures 135, 136 and 137. In the FIG. 12 position of element 127, the first valving wall 129 of that element completely covers aperture 137, to prevent the flow of air therethrough; while the second valving wall 130, in the FIG. 12 position, is preferably located just slightly beyond a position of exact registry with aperture 135. This initiates the discharge of air from a first end of the piston through aperture 135 and recess 134 at the underside of the valve into exhaust aperture 136. When the valve then moves circularly beyond the FIG. 12 position in the direction of the FIG. 13 position, aperture 136 is exposed laterally beyond the valve element for admission of inlet air from chamber 106, to the second end of the piston. Thus, the pressure is relieved from one end of the piston before it is admitted to the opposite end, to avoid any tendency for hang-up of the piston in an intermediate position. Reverse movement of the valve toward the FIG. 15 position from the FIG. 12 position places aperture 135 in communication with the inlet, and aperture 137 in communication with the outlet opening 136, with the same slight overlap of the exhaust and inlet. In all positions of the valve element, the relatively high pressure of the air at the upper side of the valve urges it tightly downwardly against plate 57 for valving coaction therewith. During non-operating intervals when no pressure is present in the tool, the valve element may be retained against upward movement in any suitable manner, as by appropriately shaping and positioning the under-surface 121 of the top wall of part 101; or by providing a spring clip or ring 148 tightly gripping the upper portion of post 115 and projecting laterally to partially overlie and prevent upward movement of the valve element. An arcuate groove 217 (FIG. 18) formed at the underside of element 117 and having portions at both sides of opening 122 allows flow of inlet air along the underside of element 117 to openings 135 and 137 when they are not covered by valve element 127.

Figure 8:
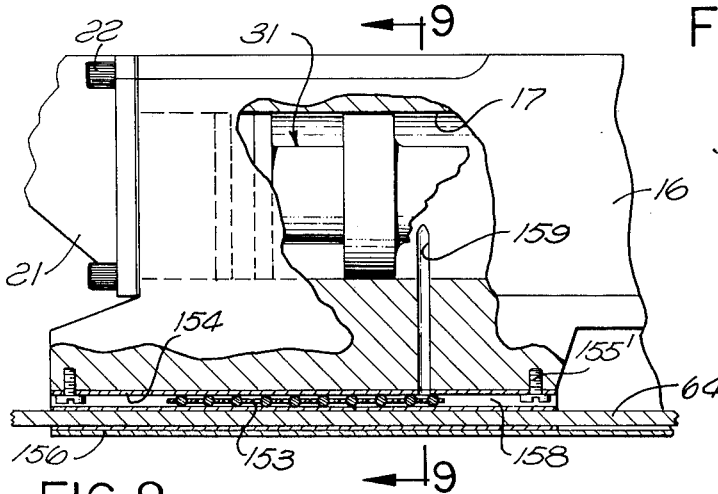
FIG. 8 is a fragmentary side view of the tool, taken in part on line 8—8 of FIG. 4, but partially broken away.
Figure 9:
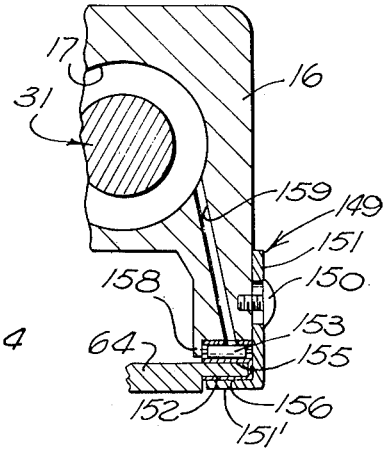
FIG. 9 is a vertical section on line 9—9 of FIG. 8.

The shoe 11 is desirably guided for its reciprocating movement relative to body 11 by means of two elongated guiding and retaining brackets 149 secured to the lower opposite side portions of body part 16, as by screws represented at 150 in FIG. 1. Each of these brackets or tracks 149 may have a vertical portion 151 extending downwardly along the vertical side surface of the body part 16, and carrying an inturned horizontal flange 151' slidably engageable with an under surface 152 of a lateral flange portion of part 64 to confine the shoe for only the desired longitudinal movement. For transmitting downward forces from body 16 to part 64, there may be provided four needle bearing assemblies 153 (FIGS. 8 and 11) each engageable at its upper side against a horizontal wear plate 154 secured by screws 155' to the underside of body 16, and engageable at its underside with the upper horizontal portion 155 of a U-shaped wear part 156 (FIG. 9) which is slipped over and retained on an edge of plate 64. The outer vertical portion 256 of part 156 may be received within a shallow recess or notch 356 formed in the side of plate 64, to locate part 156 axially relative to plate 64, and to bring the outer surface of portion 256 into the same vertical plane as the outer side surface 164 (FIG. 3) of the remainder of plate 64 so that both may slidably engage portion 151 of track 149.

The heads of the screws 155' positively confine the needle bearing assemblies 153 axially, while permitting sufficient clearance for their rolling engagement with the plates 154 and 155. The bearings are retained laterally by the vertical flanges 151 of track elements 149, and by short downwardly projecting flanges 158 formed on body 16. As represented in FIG. 4, there desirably are four such roller bearing assemblies 153 near the four corners respectively of the tool, and each having associated with it a set of the wear plates 154 and 156, and screws 155'. To assist in keeping the bearings 153 clean at all times, a small amount of the discharge air from the piston and cylinder mechanism may be discharged past these bearings, through four passages 159 extending downwardly from the central discharge air portion of cylinder bore 17, and through the material of body 16 to the locations of the needle bearings (See FIGS. 8 and 9). This air flows longitudinally past the needle bearings to their opposite ends, from which it can discharge to the atmosphere, carrying with it any particles or the like which may be picked up from the vicinity of the needle bearings. Also, the air may contain lubricant mist for continuously lubricating these needle bearings, as well as all of the other working parts past which the air flows.

To discuss the operation of the tool, assume that air is being supplied under pressure from source 13, and that an operator actuates trigger 108 to open valve 107 for admitting air into chamber 106 of FIG. 2. Valve element 127 alternately admits that air to the opposite end chambers 24 and 30 of the cylinder, to reciprocate piston 31 and its racks 38 and 29, causing corresponding rotary oscillation in opposite directions of the engaged gear wheels 53 and 54, and connected lower gears 55 and 60, with these latter gears acting through racks 82 and 84 to reciprocate shoe 11 and the carried sandpaper relative to body 11 but reversely with respect to piston 31.

If at a particular instant the piston 31 is in its rightmost position as viewed in FIG. 2, sector 117 and valve 127 are in their FIG. 15 positions, in which valve aperture 135 is exposed for reception of inlet air, to flow through passages 139 and 141 of FIG. 4 to the right end of the piston, and cause its leftward movement in FIG. 2. At the same time, aperture 137 is in communication with discharge aperture 136, to allow air from the left chamber 24 of the cylinder to discharge through the aspirator and to atmosphere. As the piston moves leftwardly, it causes slow clockwise rotation of sector 117 about its axis 116 from the FIG. 15 position toward the FIG. 14 position. The initial portion of this movement does not cause corresponding movement of valve element 127, because of the gap at 65 in FIG. 15. After sufficient lost motion to take up this gap, surface 125 of the sector engages side wall 130 of the valve element, to commence rotary movement of the valve element with the sector. This movement of the valve element progressively closes both of the apertures 135 and 137, as the intermediate position of FIG. 12 is approached, and at approximately that position reverses the connections to the ends of the cylinders, first placing aperture 135 and the right end of the cylinder in communication with discharge aperture 136, and slightly thereafter opening aperture 137 to the inlet air for communication therethrough of such air to the left end of the cylinder. Because of the lost motion resulting from the provision of gap 65 between valve element 127 and sector 117, the shifting of the valve does not occur until near the end of the stroke, and just sufficiently in advance of the end of that stroke to reverse the connections appropriately for optimum reciprocation. When the piston reaches the left end of its stroke, in the FIG. 13 position of the valve, the motion of the sector reverses to become counterclockwise, and after predetermined lost motion dependent upon gap 166 commences counterclockwise rotation of the valve element back through the FIG. 12 intermediate position to the FIG. 15 initial position.

It is found that this valving system causes actuation of the piston in a very positive manner, rendering the piston self-starting under virtually all conditions, and avoiding the usual tendency of most prior sanders to require manual starting by exerting force against the shoe. Also, the sector actuated valve permits positive operation of the piston at any of numerous different air inlet pressures, with the result that the speed of operation of the piston and shoe can be controlled within a wide range by adjustment of the air pressure through control element 110 and without causing stalling of the tool.

Of great importance in minimizing vibration of the handles and main body 11 of the tool is the described gear and rack type drive. Since all forces exerted transversely of axis 18 between piston rack 38 and its engaged gear 59 are exactly balanced by corresponding forces exerted by the opposite rack 39 and its engaged gear 53, there is no tendency for the racks and gears to urge piston 31 laterally or transversely in either direction relative to the cylinder body, and consequently wear of the piston and cylinder is mimimized. The rotary forces exerted against or through the gear units are similarly balanced and in opposition to one another, to avoid any tendency for cocking of the piston relative to the cylinder body. Similarly, all lateral forces which are exerted transversely of axis 18 by lower gears 55 and 60 against their engaged oppositely facing racks 84 and 82 are balanced, to avoid any tendency for displacing the shoe laterally relative to the body, or cocking the shoe, or causing other unwanted movement thereof other than the desired relative longitudinal movement of the parts. Besides these factors, the fact that the direction of longitudinal movement of the shoe is at all times in opposition to the direction of movement of the piston, relative to body 11, balances the longitudinal displacements relative to the body, to coact with the discussed transverse balancing of the gears and racks, and prevent any substantial vibration of body 11.

Figure 19:
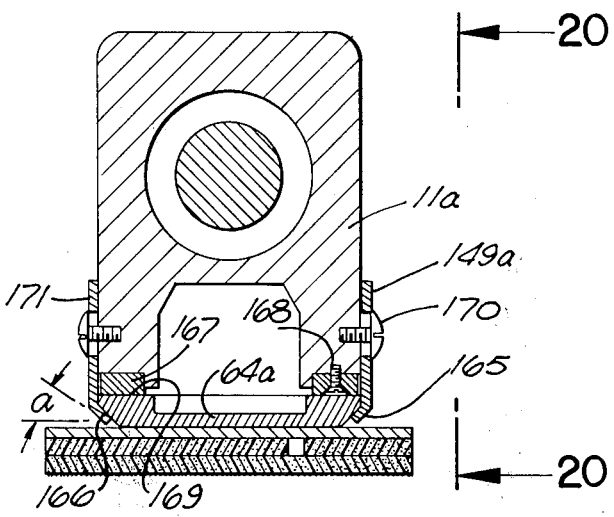
FIG. 19 is a view similar to FIG. 9, but showing a variational form of the invention.
Figure 20:
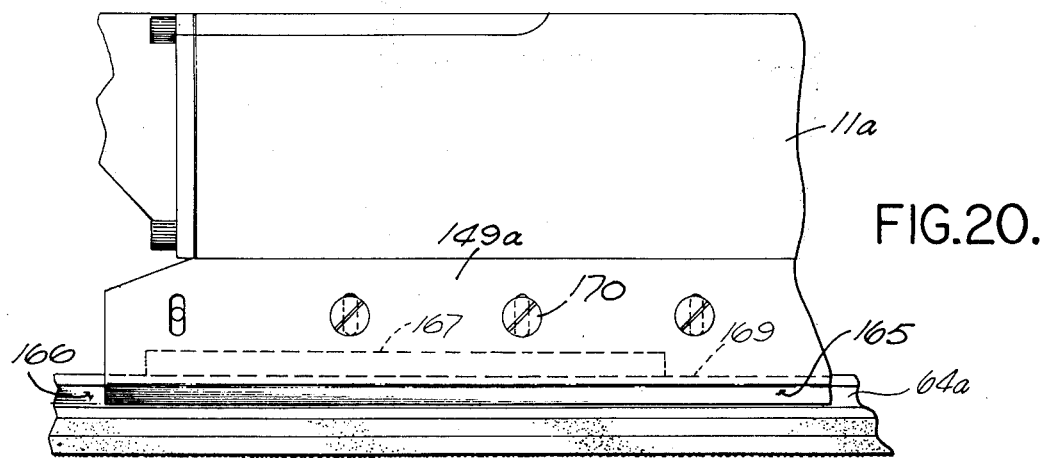
FIG. 20 is taken on line 20—20 of FIG. 19.

FIGS. 19 and 20 show a variational form of the invention in which the side retaining tracks 149a, corresponding to tracks 149 of FIGS. 3 and 99, have inwardly inclined lower portions 165, which are disposed at an angle a to the horizontal and slidably engage and guide two correspondingly inclined surfaces 166 formed at the underside of the main shoe plate 64a (corresponding to plate 64 of the first form). In lieu of the needle bearings 153 of the first form of the invention, the arrangement of FIGS. 19 and 20 may have four horizontal bearing plates 167 formed of an appropriate bearing metal and secured in fixed positions to the underside of body 11a as by screws 168, at the four corner locations at which needle bearings 153 are provided in the first form of the invention. The upper horizontal surface 169 of shoe plate 64a slidably engages the four bearings plates 167 in locating and guiding relation. Tracks 149a may be secured to body 11a by a series of screws 170 threadedly connected into body 11a, with the screws extending through vertical slots in the vertical portions 171 of the tracks to allow upward and downward adjustment of the tracks to positions in which they effectively and closely confine and guide the opposite edges of shoe plate 64a. Tracks 149a are retained in a properly adjusted position relative to body 11a by tightening the heads of the screws 170 against portions 171 of the tracks. To enable plate 64a to engage the guiding parts directly without excessive, plate 64a may be formed of hard anodized aluminum.

While certain specific embodiments of the present invention have been disclosed as typical, the invention is of course not limited to these particular forms, but rather is applicable broadly to all such variations as fall within the scope of the appended claims.

I claim:
1. Apparatus comprising:
   a structure reciprocable by pressure fluid alternately admitted to two different chambers;
   means forming a surface containing fluid passing valving apertures;
   an actuating part mounted for limited rotary oscillating movement about a predetermined axis and near said surface;
   a valve element slidable across and relative to said surface in a relation controlling the fluid flow through said apertures to produce said reciprocation, and connected to siad actuating part for oscillation thereby;
   said actuating part being free from limited turning movement about said axis relative to said valve element so that upon movement in each rotary direction said part first turns through a predetermined angle without displacing said valve element and then turns through a further angle with the valve element to shift it relative to said surface and apertures;
   said apertures including two circularly spaced apertures communicating with said two chambers respectively to deliver pressure fluid thereto, and a circularly intermediate aperture communication with the atmosphere;
   said actuating part containing a confining recess loosely receiving said valve element for lost motion of the actuating part relative thereto;
   said valve element having a recess at its underside facing said surface for placing said intermediate aperture in communication with said two first mentioned apertures alternately;
   a pressure fluid inlet passage leading inlet fluid to a side of said valve element facing away from said surface in a relation urging said valve element against said surface while alternately passing said inlet fluid to said two first mentioned passages when they are not covered by the valve element;
   a gear unit having teeth engagable by said reciprocable structure to turn the gear unit about a second axis in response to reciprocation of said structure;
   said gear unit having additional teeth engaging said actuating unit;
   said actuating unit being a gear sector having teeth meshing with said last mentioned teeth of the gear unit to turn the actuating part about said first axis in response to turning movement of said gear unit about said second axis.

2. Apparatus as recited in claim 1, in which said sector has a surface facing said first mentioned surface and containing a recess through which pressure fluid can flow between said surfaces and to one of said apertures.

3. An improved valve assembly for a reciprocating mechanism comprising:
   means forming a surface containing fluid passing valving apertures;
   a gear sector mounted for limited rotary oscillating movement about a predetermined axis, with said surface near and facing toward said sector, said sector having a series of gear teeth extending arcuately about said axis;
   a drive gear mounted for rotary oscillating movement about a second axis essentially parallel to said first axis, and having teeth meshing with said teeth of said sector to rotatively oscillate said sector about said first axis in response to rotary movement of said drive gear about said second axis;
   a valve element slidable across and relative to said surface in a relation controlling the fluid flow through said apertures to produce said reciprocation, and connected to said gear sector for oscillation thereby;
   said sector being free for limited turning movement about said first axis relative to said valve element so that upon movement in each rotary direction said sector first turns through a predetermined angle without displacing said valve element and then turns through a further angle with the valve element to shift it relative to said surface and apertures.

4. A valve assembly as recited in claim 3, in which said gear sector contains a locating recess toward which said surface and said valving apertures face, and loosely confining said element for turning movement about said first axis with the sector and for limited turning movement about said first axis relative to the sector.

5. A valve assembly as recited in claim 3, in which said apertures include two circularly spaced first apertures, and a circularly intermediate aperture discharging to the atmosphere, said valve element having a recess at its underside adapted to place said intermediate aperture in communication alternately with said two first mentioned apertures respectively.

6. A valve assembly as recited in claim 3, including fluid inlet means for delivering inlet pressure fluid to a side of said valve element facing away from said surface in a relation urging said valve element against said surface by said fluid pressure.

7. A valve assembly as recited in claim 3, in which said apertures include two circularly spaced first apertures, and a circularly intermediate aperture communicating with the atmosphere, said sector containing a confining recess loosely receiving said valve element for lost motion of the sector relative thereto, said valve element having a recess at its underside facing said surface for placing said intermediate aperture in communication with said two first mentioned apertures alternately, there being a pressure fluid inlet passage leading inlet fluid to a side of said valve element facing away from said surface in a relation urging said valve element against said surface while alternately passing said inlet fluid to said two first mentioned passages when they are covered by the valve element.

8. A valve assembly as recited in claim 3, in which said drive gear has additional teeth, there being a structure reciprocable by pressure fluid alternately admitted to two different chambers and engageable with said additional teeth to turn the drive gear about said second axis in response to reciprocation of said structure.

9. A valve assembly as recited in claim 3, in which said valve element is of essentially arcuate configuration defined by arcuate radially inner and outer edges and essentially radially extending opposite side edges, said gear sector containing an opening within which said valve element is loosely received and defined by arcuate inner and outer edges spaced essentially in correspondence with said inner and outer edges of the valve element and by essentially radially extending opposite side edges spaced apart circularly farther than said side edges of the valve element to allow limited movement of the valve element relative to said gear sector circularly about said first axis.

10. A valve assembly as recited in claim 9, in which there are three of said apertures each defined by arcuate inner and outer edges and circularly spaced radially extending side edges, said valve element having a recess at its underside for placing said apertures in communication and of essentially arcuate configuration having arcuate inner and outer edges and circularly spaced radially extending opposite side edges.

11. An improved valve assembly for a reciprocating mechanism, comprising:
    means forming a surface containing fluid passing valving apertures;
    an actuating part mounted for limited rotary oscillating movement about a predetermined axis and near said surface and containing an opening essentially opposite said surface;
    a valve element slidable across and relative to said surface in a relation controlling the fluid flow through said apertures, and contained loosely in said opening for oscillation by said actuating part;
    said opening in the actuating part being defined by radially inner and outer edges positioned to engage said valve element in a relation confining the valve element against movement toward or away from said axis, and by opposite side edges spaced apart far enough to allow limited turning movement of said actuating part about said axis relative to said valve element so that upon movement in each rotary direction said actuating part first turns through a predetermined angle without displacing said valve element and then turns through a further angle with said valve element to shift it relative to said apertures.

12. A valve assembly as recited in claim 11, including fluid inlet means for delivering inlet pressure fluid to a side of said valve element facing away from said surface in a relation urging said valve element against said surface by said fluid pressure.

13. A valve assembly as recited in claim 11, in which said inner and outer edges of said opening extend arcuately about said axis, and said opposite side edges extend essentially radially with respect to said axis, said valve element having arcuate inner and outer edges spaced essentially in correspondence with said inner and outer edges of said opening, and having radially extending opposite side edges spaced apart less than said side edges of said opening to allow said movement of the valve element relative to said actuating part.

14. An improved valve assembly for a reciprocating mechanism, comprising:
    means forming a surface containing fluid passing valving apertures;
    an actuating part mounted for limited rotary oscillating movement about a predetermined axis and near said surface; and
    a valve element slidable across and relative to said surface in a relation controlling the fluid flow through said apertures to produce said reciprocation, and connected to said actuating part for oscillation thereby;
    said actuating part being free for limiting turning movement about said axis relative to said valve element so that upon movement in each rotary direction said part first turns through a predetermined angle without displacing said valve element and then turns through a further angle with the valve element to shift it relative to said surface and apertures;
    said apertures being defined by arcuate inner and outer edges and circularly spaced radially extending side edges, said valve element having a recess at its underside for placing said apertures in communication and of essentially arcuate configuration having arcuate inner and outer edges and circularly spaced radially extending opposite side edges.

* * * * *